United States Patent [19]

Becker

[11] 4,415,940
[45] Nov. 15, 1983

[54] DEVICE FOR INSERTING AND EJECTING A DISKETTE CARTRIDGE INTO OR FROM A DRIVE MECHANISM

[75] Inventor: Gerhard Becker, Neunkirchen, Fed. Rep. of Germany

[73] Assignee: U.S. Philips Corporation, New York, N.Y.

[21] Appl. No.: 262,256

[22] Filed: May 8, 1981

[30] Foreign Application Priority Data

May 10, 1980 [DE] Fed. Rep. of Germany ....... 3017970

[51] Int. Cl.³ .......................... G11B 5/16; G11B 5/48
[52] U.S. Cl. ...................... 360/99; 360/103; 360/105
[58] Field of Search ............ 360/99, 103, 105

[56] References Cited

U.S. PATENT DOCUMENTS 3,973,272 8/1976 Morgan et al. ................. 360/105
4,216,510 8/1980 Manzke et al. .................. 360/99

*Primary Examiner*—Vincent P. Canney
*Attorney, Agent, or Firm*—Joseph P. Abate

[57] ABSTRACT

By inserting the diskette cartridge into the drive mechanism an ejection slide is moved into a latched position against a spring force. The latching device becomes operative when the closure of the drive mechanism is closed and comprises a monostable pivotable member. The latching device is released by a pawl device which acts in one direction only and which is movable by the closure. The pawl device is set to a ready-to-release position for the latching device when the closure is closed and is moved so as to release the latching device when the closure is opened. The movement of the pawl device is used for detecting the release operation.

8 Claims, 12 Drawing Figures

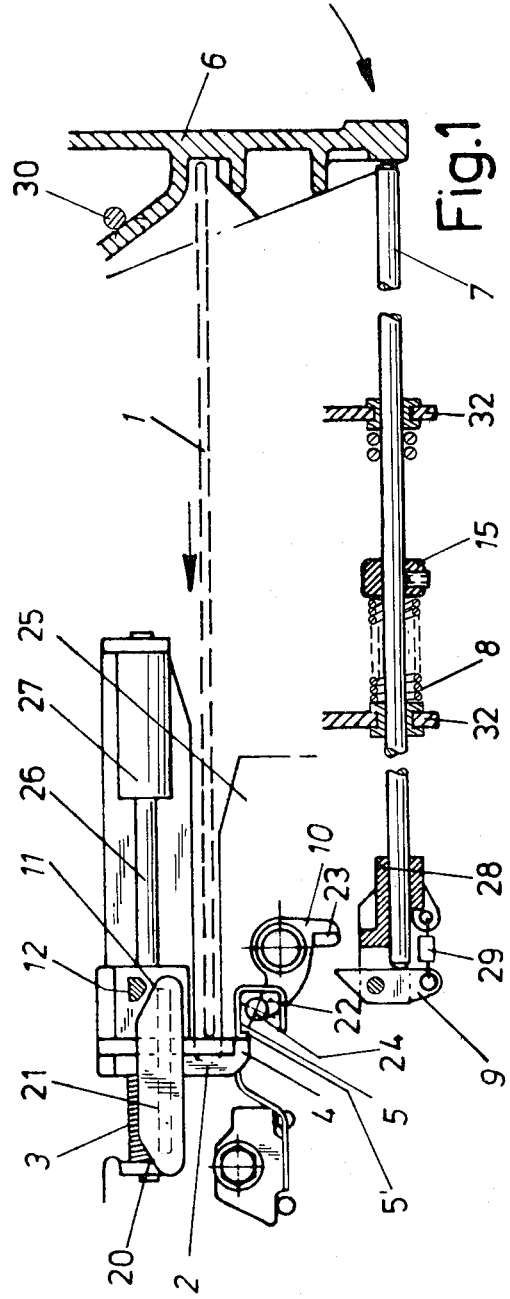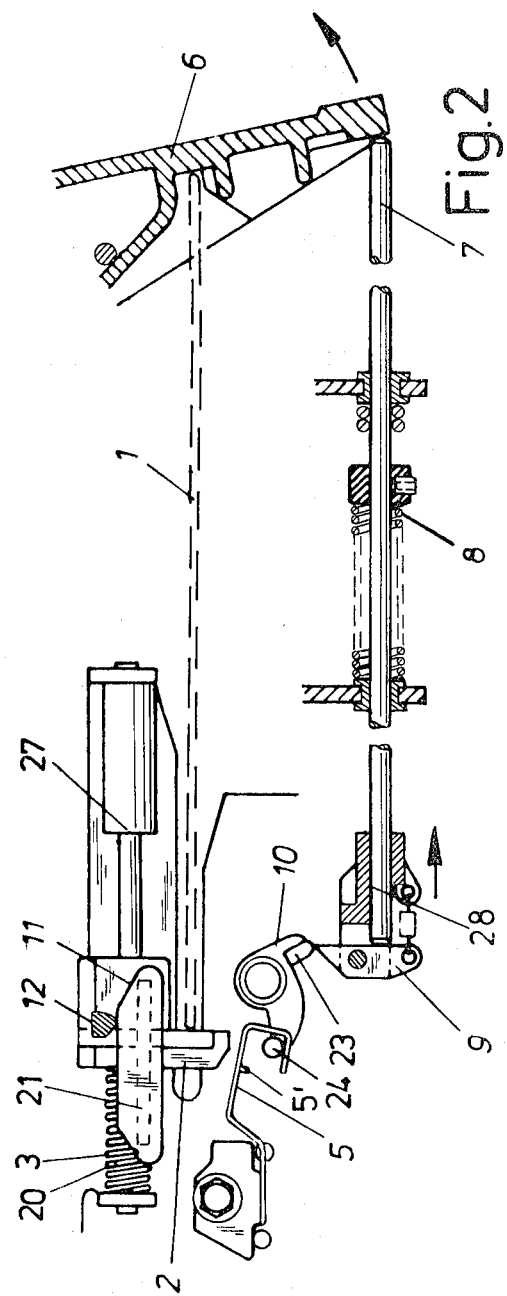

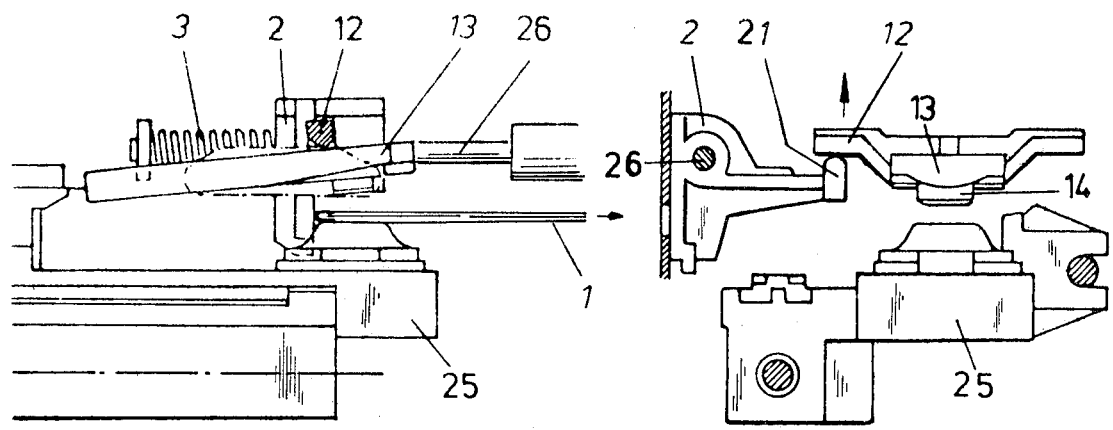
Fig. 3
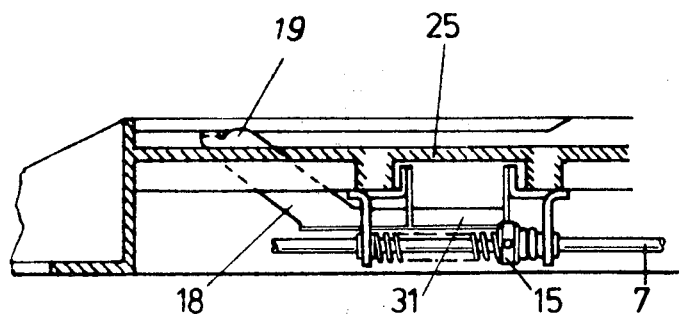
Fig. 4a
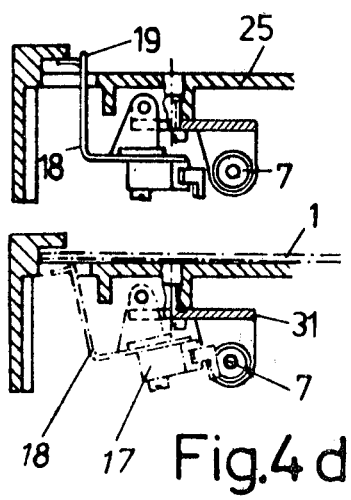
Fig. 4c
Fig. 4d
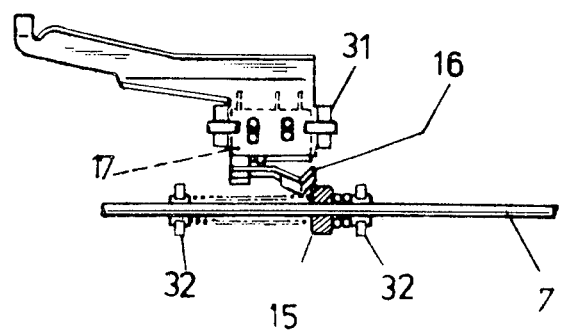
FIG. 4b

DEVICE FOR INSERTING AND EJECTING A DISKETTE CARTRIDGE INTO OR FROM A DRIVE MECHANISM

BACKGROUND OF THE INVENTION

The invention relates to a device for inserting and ejecting a diskette cartridge into or from a drive mechanism by actuation of the closure of the mechanism. The insertion of the diskette cartridge moves an ejection slide against a spring force; the slide is latched in position by closing the closure. By opening the closure, the ejection slide is unlatched and ejects the cartridge.

It is known to store data in so-called diskettes. A diskette is to be understood to mean a small flexible magnetic disk which is accommodated in a protective cartridge. For inserting the diskette cartridge into a drive mechanism or deck, the cartridge is provided with central locating holes. Furthermore, a radially disposed opening is formed on both sides of the cartridge. Through the opening, the recording and/or reproducing head engages with the magnetic disc.

When the diskette cartridge is inserted into the drive mechanism and also when said cartridge is ejected, the magnetic head must be lifted far enough from the magnetic disc so that it cannot be caught behind the edges of the opening in the cartridge. Therefore, either the cartridge should be lowered far enough or the magnetic head should be lifted accordingly.

U.S. Pat. No. 3,890,643 describes an apparatus in which the diskette cartridge is swung up about a rearward pivot. In order to remove the cartridge from the drive mechanism, the receiving slot must be opened by moving a closure. The drive mechanism with the cartridge is then pivoted so that, on the one hand, the clamping device is released and, on the other hand, slide is released. By spring force, the slide engages the back of the cartridge and moves said cartridge far enough to be accessible from the outside. The procedure is reversed when inserting the cartridge in that the cartridge pushes back the slide and tensions the ejection spring. When the receiving slot is closed, the slide is latched in order to release the cartridge by the pivotal movement of the drive mechanism.

This construction does not operate smoothly because, when receiving slot is closed, not only the closure must be moved against a spring force but also the entire weight of the drive mechanism. Therefore, the entire apparatus incorporating the drive mechanism may no longer be in a stable position and must be held in position in order to insert or eject the cartridge. Moreover, the cartridge must be lowered far enough to ensure that the magnetic head is clear of the cartridge. This leads to a large mounting height of the drive mechanism.

SUMMARY OF THE INVENTION

It is the object of the present invention to provide a device for inserting and ejecting a diskette cartridge, in which device only small forces which act mainly in the longitudinal direction of the drive mechanism must be exerted on the closure. Such a device is of a simple construction, so that the entire drive mechanism can be of a flat construction.

This object is achieved in that the latching device for the ejection slide includes a monostable pivotable member, that the latching device is released by a pawl device which acts in one direction only and which is movable by the closure, and that by closing the closure the pawl device is moved into a ready-to-release position for the latching device.

Suitably, the ejection slide is associated with a lever arm whose longitudinal direction or axis corresponds to the direction of movement of the ejection slide and which on each end is provided with an inclined surface which cooperates with a cross arm of the movable head lever. The lever arm extends parallel to the head lever. Such an arrangement has the advantage that, when the cartridge is ejected automatically, the magnetic head is also lifted simultaneously and automatically. Moreover, the inclined surfaces on both ends ensure that, in the event of an inadvertent manual maneuver, for example, when a cartridge is inserted and the write-read head is applied manually, the upper head lever is also lifted in due time, thereby preventing this vulnerable part from being bent.

A very compact and simple construction is obtained if the latching device includes a shift lever which is pivotable about an axis and which extends both in the path of the ejection slide and in the path of a pawl device. The pawl device operation then depends directly on the movement of the closure.

The position of the closure can be detected electrically by means of a movable rod which transmits the movement of the closure to the pawl device, and actuating ring and a microswitch which is actuated thereby. If the microswitch is provided with an additional sensing lever which extends into the site of the cartridge, the same microswitch may be employed for detecting the presence or absence of a cartridge.

BRIEF DESCRIPTION OF THE DRAWINGS

An embodiment of the invention will now be described in more detail in conjunction with the accompanying drawing, in which:

FIG. 1 shows the device in accordance with an the invention with inserted cartridge and closed closure;

FIG. 2 represents the device of FIG. 1 with the closure being opened;

FIG. 3 is a side and front view of the parts for lifting the magnetic heads;

FIGS. 4a to 4d represent a device for detecting the positions of the closure and the presence of the cartridge;

FIG. is a perspective view of a diskette drive mechanism comprising a device as shown in FIGS. 1 and 4, to FIGS. 6-9 are perspective views of the device shown in FIGS. 1-4 insertion of a diskette, during latching of the device, closing of the closure and opening of the closure.

DESCRIPTION OF THE PREFERRED EMBODIMENT

Only those parts of the diskette-cartridge drive mechanism are shown which are necessary for understanding the invention.

The construction of the individual parts of the drive mechanism will generally known and is not be described for the sake of clarity.

Figure 5:
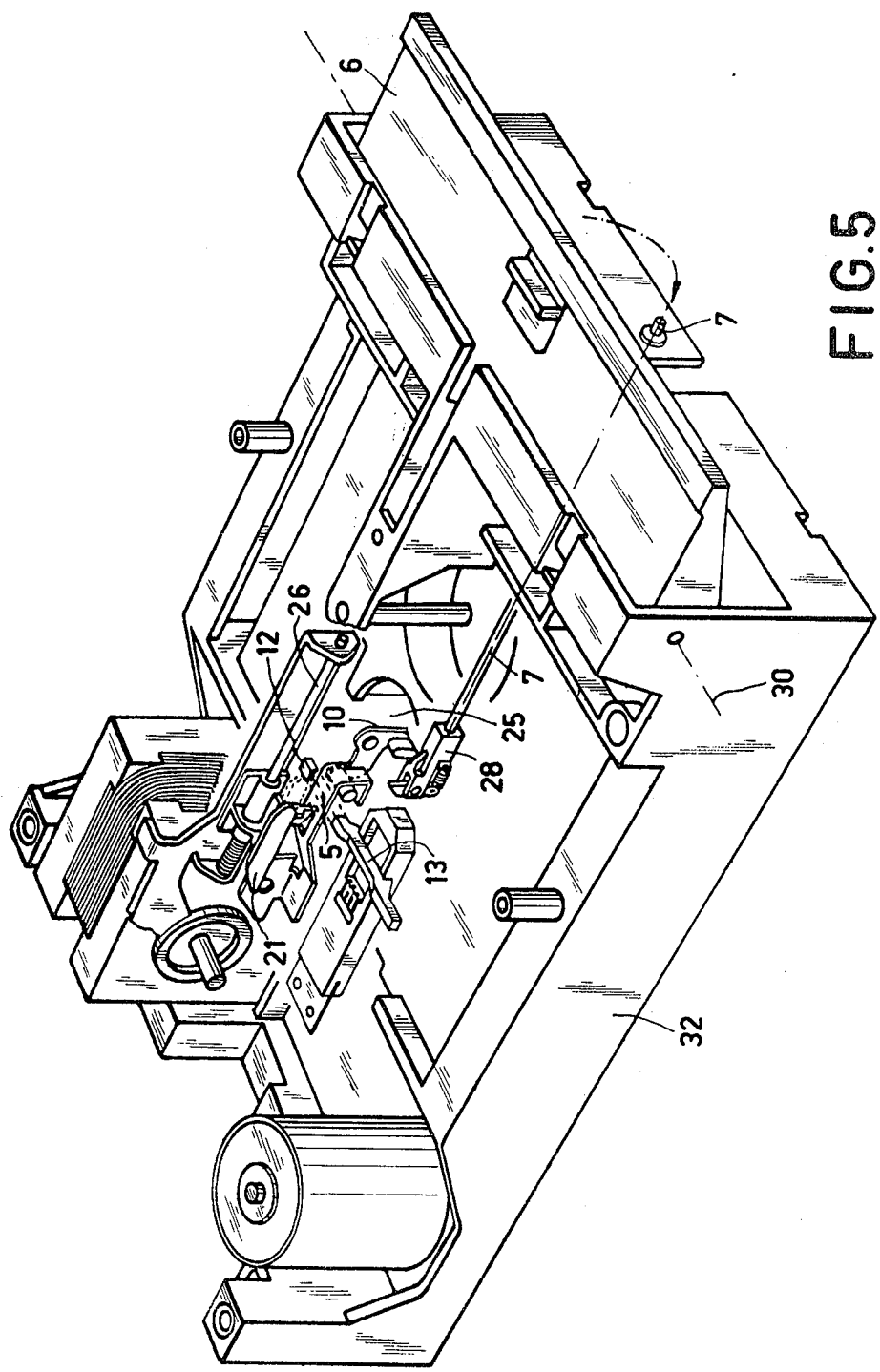
Figure 6:
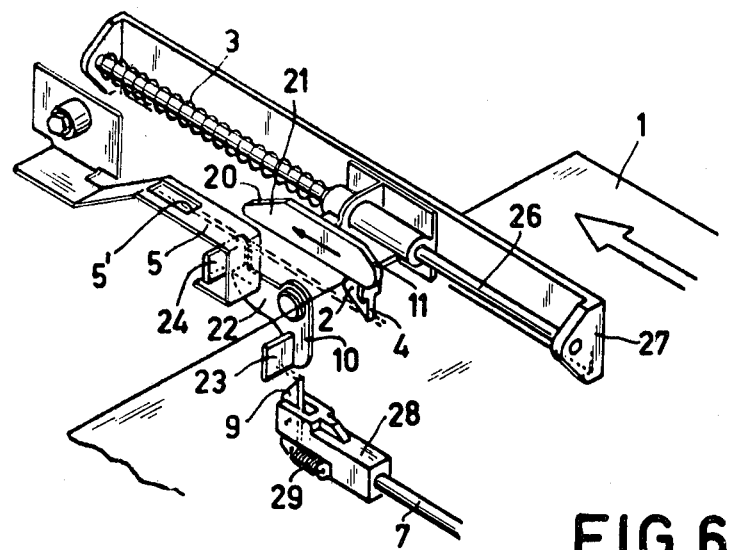
Figure 7:
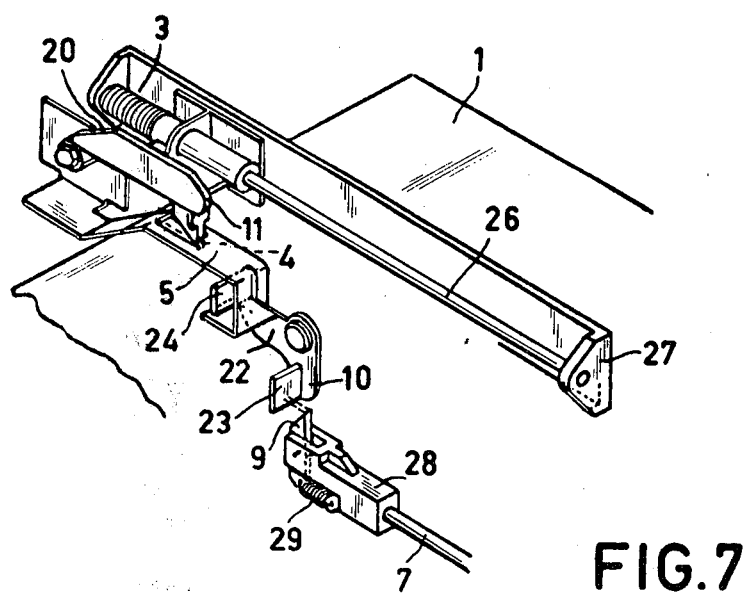
Figure 8:
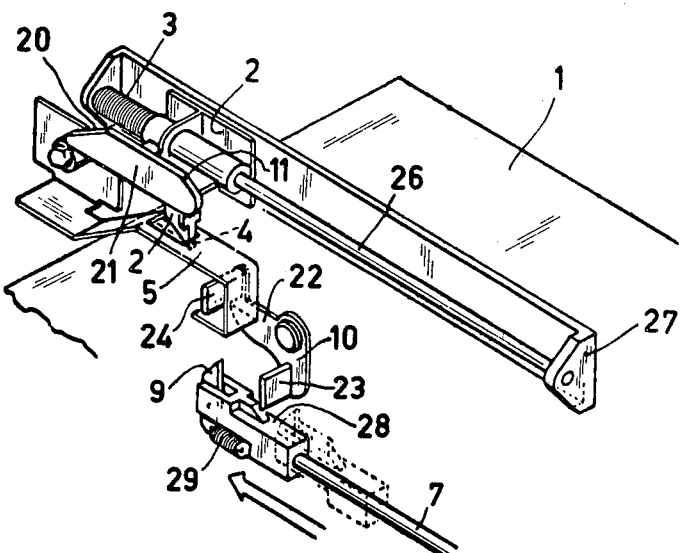
Figure 9:
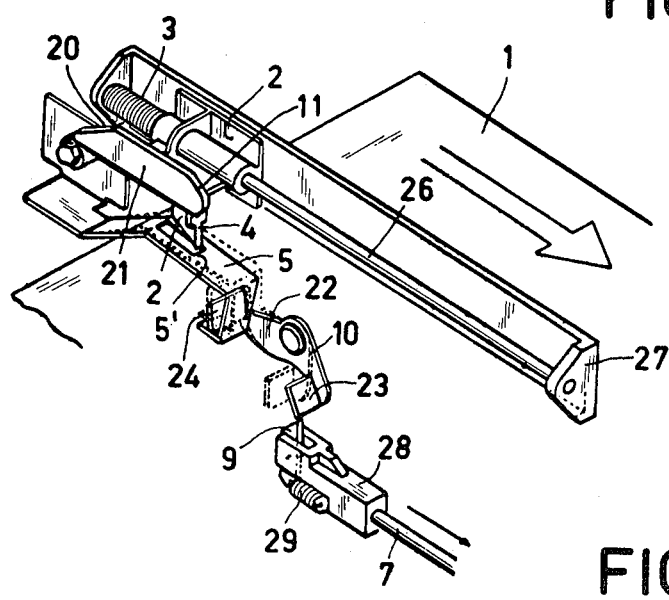

In the normal situation, as understood generally from the figures, the front of the ejection slide 2 engages the stop 27. When the closure 6 is open and a diskette cartridge 1 inserted into the receiving slot, the front of the cartridge 1 strikes against the ejection slide 2, thereby moving said slide. The ejection slide 2 is then moved along the spindle 26 against the force of the spring 3 until the shoulder 4 pivots the latching spring 5 and engages behind the latching cam 5' of the latching spring 5. See FIGS. 6 and 7. The latching spring 5 is secured to the drive mechanism; see FIG. 5.

If the closure 6 is now pivoted about the pivoting axis 30 (FIG. 1) in the direction of the arrow and is closed, the closure 6, briefly before it is closed, stripes against the rod 7 and moves said rod against the force of the spring 8. The spring 8 is tensioned between the housing 32 and an actuating ring 15 is mounted on the rod 7. On the free end of the rod 7, a pawl device 28 is mounted, which device comprises a pivotable pawl 9. The pawl 9 is arranged in such a way relative to the rod 7 that, when the rod 7 is moved in the direction of the arrow (FIG. 8), the latching device 10 pivots the pawl against the force of the return spring 29 and, when the closure 6 is closed, the pawl again assumes its original position but behind the latching device. See FIGS. 1, 5 and 8.

If the diskette cartridge is to be ejected, the closure 6 should be opened in known manner. This operation is represented in FIG. 2. By moving the closure 6 in the direction of the arrow the rod 7 is released so that now the spring 8 moves the pawl device 28 in the direction of the arrow. The pawl 9 then engages behind the one arm 23 of the latching device which includes, for example, a shift lever 10 and pivots said lever counterclockwise against the force of a spring (not shown). As a result of this, the projection 24 on the other arm 22 of the lever 10 is also moved counterclockwise. Because this projection is surrounded by the latching spring 5, it moves the latching spring 5. The latching cam 5' is moved away from the shoulder 4 of the ejection slide 2 and said slide, thus, is released. Also, see FIG. 9.

The force exerted by the spring 3 now moves the slide 2 until its front butts against the stop 27. The cartridge 1 is then moved so far out of the drive mechanism that it can readily be extracted by hand. During the movement of the ejection slide 2, its associated lifting arm 21 is also moved. As shown in FIG. 3, said lifting arm 21 then enters the path of a cross arm 12 arranged on the head lever 13. The cross arm 12 slides upwardly along the inclined surface 11 and thus lifts the magnetic head 14 away from the cartridge. The lifting arm 21 also comprises an inclined surface 20 on its back end. This surface 20 ensures that, when the cartridge 1 is inserted, the magnetic head is pivoted away regardless of the instantaneous position of the magnetic head owing to any external action.

The axial movement of the rod 7 may be utilized for electrically detecting the position of the closure 6 and/or the presence of a diskette cartridge in the drive mechanism. For this purpose, the actuating ring 15 is employed. As is shown in FIGS. 4a to 4d, the lever arm 16 of a microswitch 17 is arranged in the path of the actuating ring 15. When the closure 6 is closed, that is the rod 7 is moved to the left, the lever arm 16 is pivoted. The arm 16, in its turn, actuates the microswitch 17 in known manner. Depending on the requirements, the lever arm 16 may be actuated briefly by the actuating ring in both directions of movement of the rod 7. It is alternatively possible to construct the lever arm 16 so that the microswitch 17 is permanently actuated in the cone direction of movement of the rod 7 and is permanently held in the rest position in the other direction of movement.

Furthermore, it is possible to provide the mount 31 of the microswitch 17 with a packer arm 18 whose outer sensing lever 19 extends into the site of the diskette cartridge 1. When a cartridge is inserted, the arm 18 and, thus, the microswitch 17 is pivoted via the sensing lever 19 (dashed position in FIG. 4d). The lever arm 16 is thereby moved, into the path of the actuating ring 15, so that when the rod 7 is moved the actuating ring 15 actuates the microswitch and thereby indicates the presence of the cartridge.

FIG. 4c represents the position of the arm 18 when no cartridge is inserted. The lever arm 16 is not situated in the path of the actuating ring 15 so that the movement of the rod 7 has no effect on the microswitch.

While there has been shown and described what is at present considered the preferred embodiment of the present invention for inserting and ejecting a diskette cartridge into or from a drive mechanism, it will be apparent to those skilled in this art that various other changes and modifications may be made therein without departing from the spirit and scope of the invention as defined by the appended claims.

What is claimed is:

1. A diskette drive mechanism comprising a closure pivotally mounted on a housing, for closing a receiving slot for a cartridge accommodating a magnetic diskette, a magnetic head liftable off and engageable with a received diskette, a movable head lever on which the head is arranged, the lever extending radially relative to the axis of rotation of the diskette, and an ejection slide which, by inserting the diskette cartridge, is movable along a first path into a latched position against a force of a first spring associated with the housing and, by opening the closure, is unlatched to eject the diskette cartridge, characterized in that the ejection slide is associated with a lever arm (21) having a longitudinal axis which corresponds to the direction of movement of the ejection slide (2), the arm extending parallel to the head lever (13) and, on each end, being provided with an inclined surface (11,20) which, during inserting or ejecting of the diskette cartridge (1), cooperates with a cross arm (12) arranged on the head lever (13) to lift or lower the magnetic head (14).

2. A drive mechanism as claimed in claim 1, characterized in that a latching device (10) for the ejection slide (2) is associated with the housing and comprises a monostable pivotable member whose monostable position is the latched position, and that the latching device (10) is pivoted into the unstable release position by means of a pawl device (28) which acts in one direction only and which is movable along a second path by the closure (6).

3. A drive mechanism as claimed in claim 2, characterized in that the closure is movable against a force of a second spring (8) associated with the housing, so that the pawl device (28) can be moved into a ready-to-release position for the latching device (10).

4. A drive mechanism as claimed in claims 2 or 3, characterized in that the latching device (10) comprises a shift lever which is pivotally mounted on the housing, the shift lever including a first arm (22) having a projection (24) extending into the path of the ejection slide (2) and also including a second arm (23) extending into the path of the pawl device (28), and that the shift lever is associated with a third spring for obtaining the monostable position of the shift lever (10).

5. A drive mechanism as claimed in claim 4, characterized in that a microswitch which indicates the presence of a diskette cartridge (1) is mounted on the housing.

6. A mechanism as claimed in claim 4, characterized in that the pawl device (28) is mounted on one end of a rod (7) which is movable against a spring (8) and comprises a pawl (9) which, in one direction of movement of the rod (7), is freely movable and, in the other direction of movement of the rod (7), is not freely movable, and that when the closure (6) is closed the rod (7) is movable in the one direction and, when the closure (6) is opened, the rod is movable in the other direction by the spring (8).

7. A drive mechanism as claimed in claim 6, characterized in that an actuating ring (15) is arranged on the rod (7), which ring opens or closes a microswitch (17) by the movement of the rod (7).

8. A drive mechanism as claimed in claim 7, characterized in that a mount (31) of the microswitch (17) comprises a sensing lever (19) which extends into the site of the diskette cartridge (1).

* * * * *